US012134112B2

(12) United States Patent
Navarria

(10) Patent No.: US 12,134,112 B2
(45) Date of Patent: Nov. 5, 2024

(54) SYSTEMS AND METHODS FOR LIFTING AND DESCENDING PAYLOAD SHUTTLES WITH HIGH THROUGHPUT AND A REDUCED FOOTPRINT

(71) Applicant: Amazon Technologies, Inc., Seattle, WA (US)

(72) Inventor: Filippo Navarria, Milan (IT)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 18/064,504

(22) Filed: Dec. 12, 2022

(65) Prior Publication Data

US 2024/0189865 A1 Jun. 13, 2024

(51) Int. Cl.
*B07C 5/36* (2006.01)
*B65G 1/06* (2006.01)
*B65G 1/127* (2006.01)
*B65G 17/18* (2006.01)

(52) U.S. Cl.
CPC .............. *B07C 5/362* (2013.01); *B65G 1/065* (2013.01); *B65G 1/127* (2013.01); *B65G 17/18* (2013.01)

(58) Field of Classification Search
CPC ........ B07C 5/362; B65G 1/065; B65G 1/127; B65G 17/18
See application file for complete search history.

(56) References Cited

U.S. PATENT DOCUMENTS

| | | | | |
|---|---|---|---|---|
| 5,050,726 A | * | 9/1991 | Flagg | B65G 17/123 198/799 |
| 5,101,963 A | * | 4/1992 | Skarlupka | B65G 17/123 198/838 |
| 5,788,057 A | * | 8/1998 | Walser | B65G 1/127 211/121 |
| 6,321,899 B1 | * | 11/2001 | Hannessen | B65G 17/18 198/475.1 |
| 6,378,689 B1 | * | 4/2002 | Wellpott | B65G 47/57 198/377.01 |
| 7,278,532 B2 | * | 10/2007 | Martin | E04H 6/14 198/799 |
| 8,770,385 B2 | * | 7/2014 | Hannessen | B65G 47/57 198/607 |
| 10,611,568 B2 | * | 4/2020 | Schack | B65G 1/06 |
| 11,878,867 B2 | * | 1/2024 | Ishikawa | B65G 17/345 |

(Continued)

*Primary Examiner* — Mark A Deuble
(74) *Attorney, Agent, or Firm* — Eversheds Sutherland (US) LLP

(57) ABSTRACT

Systems, methods, and computer-readable media are disclosed for shuttle lift systems to facilitate simultaneous movement of multiple shuttles across a multi-level storage structure that stores packages. The shuttle lift system may include the multi-level storage structure and a tower lift system at each end of the multi-level storage structure. One tower lift system may raise shuttles to a level of the multi-level storage structure. The other tower lift system may lower shuttles to a level of the multi-level storage structure and/or to a delivery area. The tower lift system may include cables (e.g., tethers) that are supported by a bottom portion and an upper portion of the tower lift system. Shelves may be attached to the cables on either side of the tower lift system and may receive and move shuttles up/down the tower lift system. The tower lift system may have high shuttle throughput and a reduced footprint.

20 Claims, 8 Drawing Sheets

(56) References Cited

U.S. PATENT DOCUMENTS

2014/0277693 A1\* 9/2014 Naylor .................. B65G 1/065
700/218
2017/0313514 A1\* 11/2017 Lert, Jr. ............... B65G 1/0492

\* cited by examiner

SYSTEMS AND METHODS FOR LIFTING AND DESCENDING PAYLOAD SHUTTLES WITH HIGH THROUGHPUT AND A REDUCED FOOTPRINT

BACKGROUND

With the popularity of e-commerce and delivery services, the volume of packages delivered continues to increase. The high volume of packages requires delivery fulfillment centers and/or sorting centers capable of receiving, sorting, and distributing a large volume of packages. For example, a fulfillment and/or sorting center may fulfill millions of orders a year. As a result, fulfillment and/or sorting centers will receive, package, and distribute millions of items for delivery. Packages may be sorted and stored on various levels of a multi-level storage structure for compact and efficient package storing. While it is desirable to store packages in a high density and compact arrangement that may extend several levels high, retrieval vehicles and/or individuals must be able to easily access the stored packages for sorting and delivery. While compact storage is desirable from an efficiency and economics perspective, compact storage may make package retrieval and sorting difficult. Accordingly, there is a need for a package retrieval system in a high density sorting structure that provides efficient access to the stored packages.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
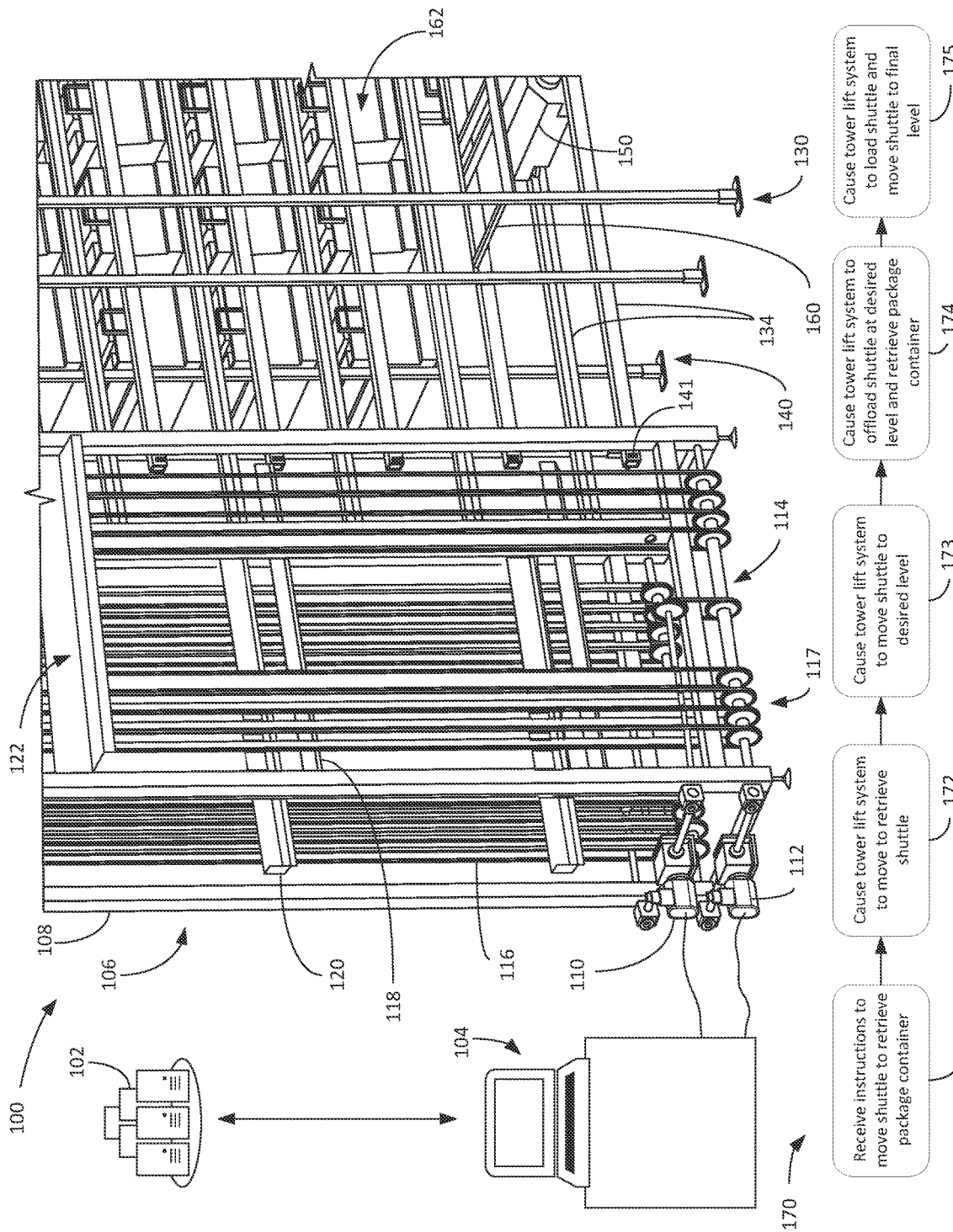
FIG. 1 is a schematic illustration of an example use case a shuttle lift system, in accordance with one or more exemplary embodiments of the disclosure.

Shuttle lift systems for multi-level package storing and retrieval are provided herein. The shuttle lift systems may be positioned within or otherwise may be integrated with fulfillment centers that may be designed to receive, induct, sort, and/or distribute a large volume of packages (e.g., products, packaged products, items, etc.). For example, the shuttle lift system may be used at or incorporated into a fulfillment center having several hundred thousand, a million, or more square feet and may deliver millions of packages per year. The term fulfillment center used herein is understood to include any fulfillment, sorting, and/or transportation center.

The package storing and retrieval systems may include one or more tower lift systems that may service a multi-level storage structure designed to store packages on various levels of the multi-level storage structure. In one example, the multi-level storage structure may store and/or support totes, bags, trays and/or the like (e.g., package container) which may receive one or more packages. Each level of the multi-level storage structure may include a rail or other similar system that may support a shuttle that may traverse each level of the multi-level storage structure and access one or more package container and/or package. The shuttle and/or multi-level storage structure may load the package containers and/or packages onto the shuttle.

The multi-level storage system may be adjacent to a tower lift system on end and another tower lift system on another end. For example, one tower lift system may be an ascender designed to lift shuttles upward and another tower lift system may be a descender which may be designed to lower shuttles. In another example, the same tower lift system may both lift and lower shuttles. The tower lift system may include drive shafts on the top and bottom that may be connected via tethers (e.g., cables, wires, ropes, braids, belts, chains, and the like) and may be designed to independently lift and/or lower a shelf. The shelf may be designed to receive and/or support a portion of all of a shuttle such that each drive shaft and shelf can independently move a shuttle on the tower lift system. The tower lift systems may thus facilitate simultaneous movement of several shuttles about the tower lift system. The tower lift system may thus have high shuttle throughput and a reduced or optimized footprint (e.g., the tower lift system may require relatively small floor space considering the high throughput).

In one example, the tower lift system may include four shelfs on one side of the tower lift system and four shelfs on an opposite side, with each shelf supported by two cables or tethers. Each shelf may have a counterpart shelf on the other side of the tower lift system, which may move in sync with its counterpart shelf such that each pair of shelves move up and down together at the same height. Each shelf and its counterpart may be designed to support two sides of a shuttle. One or both of the shelves may include a power delivery system such as an electrified rail for delivery power to the shuttle. A controller may control the tower lift system, the shuttles, and/or the multi-level storage system.

Referring to FIG. 1, an example use case of a shuttle lift system 100 is depicted in accordance with one or more exemplary embodiments of the disclosure. Shuttle lift system 100 may be in a fulfillment center and/or and be designed to efficiently move and deliver shuttles for carrying payloads to various levels for storage and/or retrieval of packages. In one example multiple shuttle lift systems 100 may be included in a fulfillment center and/or shuttle lift system 100 may include additional or fewer components than those illustrated in FIG. 1.

As shown in FIG. 1, shuttle lift system 100 may include server 102, controller 104, tower lift system 106, and multi-level storage structure 130 and multi-level storage structure 140. It is understood that a second tower lift system may be positioned at an opposite end of multi-level storage structure 130 and multi-level storage structure 140. Tower lift system 106 may be connected and/or secured to multi-level storage structure 130 and/or multi-level storage structure 140 or may be stand alone. In one example, tower lift system 106 may be offset from multi-level storage structure 130 and multi-level storage structure 140 by a certain amount. Server 102 may be in the same area as controller 104 or may be remotely situated. Alternatively, server 102 may be optional.

Controller 104 and/or server 102 may control tower lift system 106 and/or multi-level storage structure 130 and multi-level storage structure 140. Controller 104 may include one or more processors and/or a display. For example, controller 104 may be a laptop, desktop, tablet, smart-phone or any other electronic or computing device. Controller 104 may facilitate communication to, from, and/or between components of shuttle lift system 100 (e.g., drive shafts, motors, power systems, etc.), may process information, and/or perform operations and tasks described herein alone or together with server 102.

Controller 104 may communicate with server 102, tower lift system 106, multi-level storage structure 130 and/or multi-level storage structure 140, or any other computing devices, via any well-known wired or wireless system (e.g., Bluetooth, Bluetooth Low Energy (BLE), near field communication protocol, Wi-Fi, cellular network, etc.). Server 102 may be one or more servers, computers, desktop computers, laptop computers, datastores, and/or any other electronic or computing device. Server 102 may communicate with controller 104, tower lift system 106, multi-level storage structure 130 and/or multi-level storage structure 140, or any other computing devices, via any well-known wired or wireless system.

Tower lift structure 106 may include support frame 108. Support frame 108 may be rectangular in shape and may be made from rigid material (e.g., metal, wood, plastic, etc.). For example, support frame 108 may include four main posts that are connected and/or braced together at top and bottom portions forming a generally rectangular structure. Tower lift structure 106 may further include drive shafts 114 near a bottom portion and a top portion of tower lift structure 106, which may be supported by support frame 108.

Cables 116 may extend between two support shafts 114 and may be supported on by an drive shaft on an upper portion of support frame 108 and a lower portion of support frame 108. It is understood that cables 116 and/or the term cables used herein may be tethers, ropes, chains, belts, wires, any other similar structure, or any combination thereof. For example, cables 116 may be cable loops (e.g., cables forming complete loops). Bearings 117 may be positioned over drive shafts 114 and may be designed to facilitate rotation over drive shafts 114. Cables 116 may be rotationally connected to one drive shaft and rotationally independent with another drive shaft. Rotationally connected means that rotating a drive shaft causes a cable to rotate. Rotationally independent means that rotating a drive shaft does not cause a cable to rotate. Each cable may be connected to a single shelf (e.g., tray, rail, shuttle support, etc.). For example, shelf 120 may be connected to two cables of cables 116.

Shelf 120 may be designed to receive a shuttle and may be connected to a cable on either side of shelf 120. Shelf 120 may be designed to receive one end of shuttle 150 and shelf 118, which may move in sync with shelf 120, may be designed to receive and support another end of shuttle 150. Shelf 118 may be the same or similar to shelf 120. For example, shelf 120 and/or shelf 118 may include wheel receiving portions (e.g., a wheel receiving rail) designed to support one or more wheels of shuttle 150.

Shelf 120 and/or shelf 118 may further include a power transmission system to transfer electrical power to shuttle 150 to power shuttle 150. For example, shelf 120 may include an electrified rail and shuttle 150 may include brush arms for contacting the electrified rail for providing electrical power to power shuttle 150. Similarly multi-level storage structure 130 and/or multi-level storage structure 140 may include a power transmission system to transfer electrical power to shuttle 150 to power shuttle 150 (e.g., one or more electrified rails). Alternatively, shuttle 150 may include a power source (e.g., battery).

As shown in FIG. 1, shelve 120 and shelf 118 may each be positioned on an interior of support frame 108 and may be designed to move up and/or down support frame 108 via cables 116. Motor 110 and/motor 112 may be designed to move drive shafts 114 on a lower portion of support frame 108 and similar motors may move drive shafts on a top portion of support frame 108. Each motor may turn two drive shafts simultaneously, each drive shaft rotationally connected to cables. In one example, each motor may cause two cables each connected to a shelf (e.g., shelves 120 and 118) on opposite sides of support frame 108 to move together in the same direction.

As the motors are operated independently, each motor may cause a pair of shelves to move independent of all other shelves. As shown in FIG. 1, each motor (e.g., motor 110 and motor 112) may cause each shelf to move along an interior of support frame 108 and continue to move along an exterior of support frame support 108 as cables 116 form a complete loop around support structure 108. For example, shelf 122 may have traversed an interior of support frame 108 and is now traversing the exterior of support frame 108.

Tower lift system 106 may be positioned between multi-level storage structure 130 and multi-level storage structure 140. Each of multi-level storage structure 130 and multi-level storage structure 140 may include levels 160, which may be designed to support package containers 162. For example, each level may be a shelf, floor, or the like for supporting package containers 162. It is understood that levels 160 of each of multi-level storage structure 130 and multi-level storage structure 140 may be the same height. A shuttle (e.g., shuttle 150) may move between multi-level storage structure 130 and multi-level storage structure 140 along rails (e.g., rails 134) of each multi-level storage structure and may receive package containers and/or packages from one or both of multi-level storage structure 130 and multi-level storage structure 140.

Each of multi-level storage structure 130 and multi-level storage structure 140 may include rails 134 at each level designed to align with shelves of tower lift system 106 (e.g., shelf 120 and shelf 118). Interior rails 134 may be designed to receive and support shuttles 150 and may include a power transmission system (e.g., an electrified rail or portion). Shuttles may transfer from rails 134 to shelves of tower lift system 106. Sensors 141 (e.g., photocells) may be positioned at the entrance and/or exit of each level of multi-level storage structure 130 and multi-level storage structure 140 to detect obstacles. Additionally, each level may include a bar code or other optical identifier (e.g., QR code) and/or digital identifier (e.g., RF transmitter) and shuttle 150 may include a reader for determining information about each level (e.g., a level identifier, linear encoder).

To initiate the actions of moving a shuttle to retrieve a package container using shuttle lift system 100, example process flow 170 may be performed. At a block 171, controller 104 may receive instructions (e.g. from server 102) to move a shuttle to retrieve a package container. At block 172, controller 104 may cause tower lift system to move shelf 120 and shelf 118 to a certain level to receive shuttle 150. For example, controller 104 and/server 102 may determine that package container 162 on a second level needs to be retrieved and lowered to a package delivery area. In one example, server 102 may be responsible for overseeing package flow in the fulfillment center and for requesting that packages be moved from one area to another. In another example, controller 104 may perform the foregoing tasks and server 104 may be removed from shuttle lift system 100.

At block 172, controller 104 may cause a certain motor (e.g., motor 112) to cause a drive shaft to move corresponding cables (e.g., cables 116) to move corresponding shelves (e.g., shelves 118 and 120) to the same level as shuttle 150. At block 174, controller 104 and/or server 102 may cause shuttle 150 to move to multi-level storage structure 130 or multi-level storage structure 140 to retrieve the package container (e.g., package container 162) as shown in greater detail in FIG. 3B.

At block 175, controller 104 and/or server 102 may then cause multi-level storage structure 130 and/or multi-level storage structure 140 to move shuttle 150 to another tower lift system for descending the shuttle 150 and package container 162 to a delivery area. It is understood that tower lift system 106 may be tasked with lifting shuttles 150 and the tower lift system on the opposing side of multi-level storage structure 130 and/or multi-level storage structure 140 may be tasked with lowering shuttles 150. It is understood that a similar approach may be used to deliver a package and/or package container to the multi-level storage structure.

Illustrative Process and Use Cases

Figures 2A, 2B:
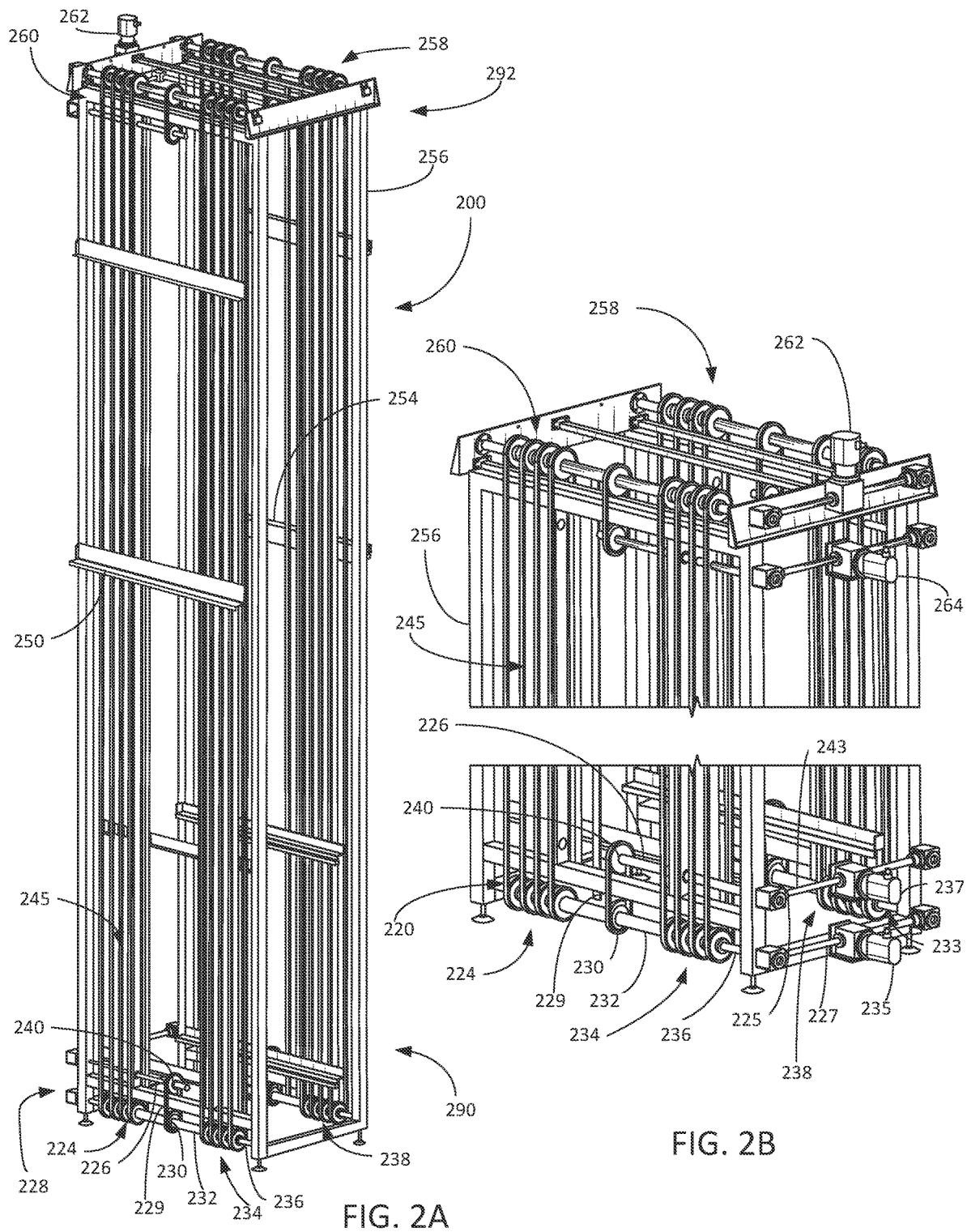
FIGS. 2A-2C are a schematic illustrations an example use case of a tower lift system of the multi-level package sorting system, in accordance with one or more exemplary embodiments of the disclosure.
Figure 2C:
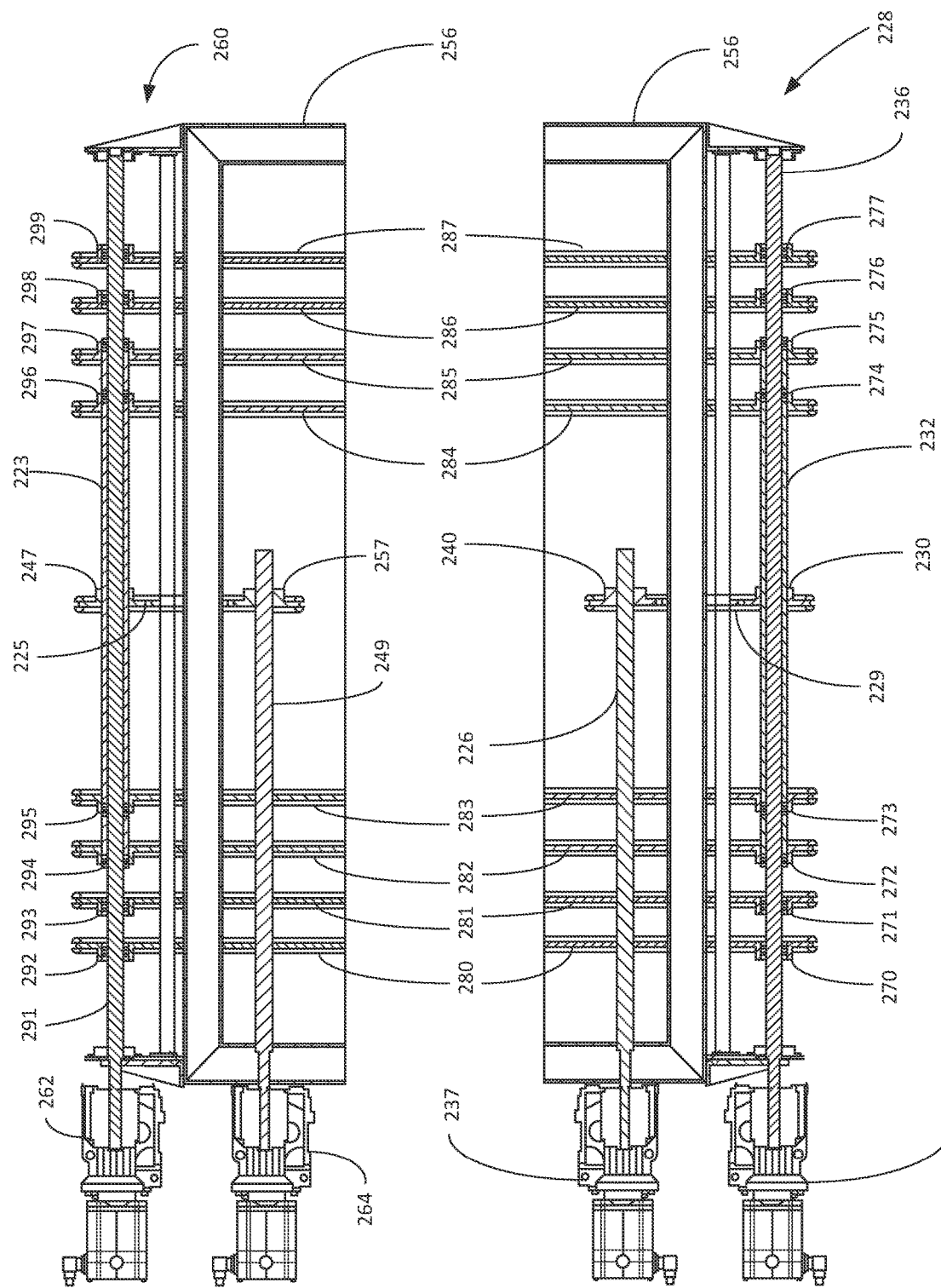

Referring to FIGS. 2A-2C, an exemplary tower lift system of a shuttle lift system (e.g., shuttle lift system 100 of FIG. 1) is illustrated. FIG. 2A illustrates a perspective view of tower lift system 200 and FIG. 2B illustrates a truncated perspective view of tower lift system 200. Tower lift system 200 may be the same or similar as tower lift system 106 of FIG. 1. Tower lift system 200 may include support frame 256, which may be the same as or similar to support frame 108 of FIG. 1.

Tower lift system 200 may include motor 237 and motor 235 on a lower portion of tower lift system 200. Motor 237 and/or motor 235 may be a brushless DC motor, for example, or any other well-known motor. Motor 235 may be secured to support frame 256 and may include primary drive shaft 227 which may be connected to secondary drive shaft 236 and secondary drive shafts 236 and 233. Drive shafts 233 and 236 may be perpendicular to drive shaft 227 and may be caused to rotate by drive shaft 227. Drive shaft 236 may interface with cable supports 234 and cable supports 224, which each may be connected to cables 245. For example, each of cable support 234 and cable support 224 may be connected to a cable (e.g., cables 245).

Cables 245 may be any cable, wire, belt, or the like. For example, cable 245 may be a metallic wire, braided cable, a synthetic belt, etc. It is understood that cables 245 may optionally include an electrical connection such as an electrical wire, which may be insulated. Cables 245 may attached to one shelf (e.g., shelf 250). Each shelf may be supported by two cables designed to move up and/or down in sync. A cable of cables 245 may optionally provide an electrical connection to a shelf.

Each cable of cables 245 may be supported by at bottom portion 290 of tower lift system 200 and top portion 292 of tower lift system 200. For example, cable support 234 and cable support 224 may have a cylindrical structure designed to interface with the drive shafts 232 and 236 as well as cables (e.g., cables 245). Each cable of cables 245 may be rotationally connected to two cable supports. Each cable support may be supported by a drive shaft with one cable support being rigidly connected to a drive shaft and another cable support being rotationally independent of a drive shaft. For example, the cable support (e.g., cable support 234 and cable support 224) may include a bearing at an interface with the drive shaft such that the cable support may turn independent of the drive shaft and vice versa.

It is understood that each drive shaft may be rigidly connected to two cable supports and may support but may be rotationally independent from two cable supports. As shown in FIGS. 2A and 2B, drive shaft 236 may be positioned within outer drive shaft 232, which may house a portion of drive shaft 236 and may be rotationally independent from drive shaft 236. Outer drive shaft 232 may be rigidly connected to two cable supports and may support but may be rotationally independent from two cable supports. Outer drive shaft 232 may be supported by support frame 256, but may be free to rotate.

Outer drive shaft 232 may interface with cable support 230, which may be rigidly connected to outer drive shaft 232. Cable 229 may extend between cable support 230 and cable support 240. Cable support 240 may be the same or similar as cable support 230 and may be rigidly connected to drive shaft 226. Drive shaft 226 may extend partially across a side of support frame 256. As drive shaft 226 rotates, cable 229 may translate rotational motion from drive shaft 226 to outer drive shaft 232. Drive shaft 226 may be connected to primary drive shaft 243, which may be perpendicular to drive shaft 226. Primary drive shaft 243 may be connected to motor 237 which may cause primary shaft 244 and thus drive shaft 226 to rotate.

Drive shaft 236, cable supports 224 and 236, outer drive shaft 232, cable support 230, cable 229, cable support 240, and drive shaft 226 may collectively be referred to as cable assembly 228. Tower lift system 200 may include four cable assemblies that are the same as or similar to cable assembly 228, two on a bottom portion 290 of support frame 208, and two on an upper portion 292 of support frame 208. For example, tower lift system 200 may include cable assembly 238, which may be in mechanical communication with motors 235 and 237, and cable assembly 260 and 258, which may be in mechanical communication with motors 262 and motors 264, which may be the same as or similar to motors 235 and 237.

In one example, eight cables may extend between cable assembly 228 and 260 and eight cables may extend between cable assembly 238 and 258. Four shelves may be connected to the cables extending between cables assemblies 228 and 260, with each shelf connected to two cables. Similarly, Four shelves may be connected to the cables extending between cables assemblies 238 and 258, with each shelf connected to two cables.

It is understood that tower lift system 200 may include greater or fewer shelves and cables than those shown in FIGS. 2A-2B. It is further understood that tower lift system 200 may be designed to only raise shuttles, only lower shuttles, or to both raise and lower shuttles. It is further understood that fewer motors may be used by tower lift system. For example, a single drive shaft may be used with a selectively engagable gear system for powering all four cable assemblies. In another example, a single motor may power two cable assemblies.

Referring now to FIG. 2C, a cross-sectional view of cable assembly 228 and cable assembly 260 is illustrated. As shown in FIG. 2C, support frame 256 may support motors 237 and 235 as well as motors 264 and 262. Motor 235 may power drive shaft 236 and cause drive shaft 236 to rotate. Drive shaft 236 may interface with cable supports 270, 271, 276 and 277, which may be the same or similar to cable supports 224 and/or 234. Cable supports 270 and 277 may be rotationally connected to drive shaft 236 and cables 280 and 287, respectively.

Drive shaft 236 may support cable supports 271 and 276, which may be rotationally independent from drive shaft 236. For example, drive shaft 236 may interface with cable supports 271 and 276 via bearings (e.g., ball bearings) such that drive shaft 236 may rotate without causing cable supports 271 and 276 to rotate. Cable supports 271 and 276 may be rotationally connected to cables 281 and 286, respectively. Cables 281 and 286 may be, instead, driven by motors located opposite assembly 228 (e.g., motors of cable assembly 260). As shown in FIG. 2C, assembly 260 is opposite assembly 228 and drives cables idled by assembly 228 and vice versa, such that four different cable sets can be moved independently.

Drive shaft 236 may be positioned within outer drive shaft 232 and may be powered by motor 237. Outer drive shaft 232 may support cable supports 272, 273, 274, and 275. Cable supports 272 and 275 may be rotationally connected to outer drive shaft 232. Cable supports 273 and 274 may be rotationally independent from outer drive shaft 232 (e.g., via a bearing such as a ball bearing). Cable supports 272, 273, 274, and 275 may be rotationally connected to cables 282, 283, 284, and 285. Outer drive shaft may also support and be rotationally connected to cable support 230 which may be rotationally connected to cable 229. It is understood that cable 229 may be any type of cable, chain, tether, braid, belt, or the like.

Cable 229 may be supported by cable support 230 and cable support 240. Cable support 240 may be rotationally connected to cable 229 and drive shaft 226. Cable support 230 may be rotationally connected to cable 229 and outer drive shaft 232. Drive shaft 226 may be connected to motor 237. Motor 237 may cause rotation of drive shaft 226, which may be translated to outer drive shaft 232 via cable 229.

Motor 262 may power drive shaft 291 and cause drive shaft 291 to rotate. Drive shaft 291 may interface with cable supports 292, 293, 298 and 299, which may be the same or similar to cable supports 224 and/or 234. Cable supports 293 and 298 may be rotationally connected to drive shaft 291 and cables 281 and 286, respectively.

Drive shaft 291 may support cable supports 292 and 299, which may be rotationally independent from drive shaft 291. For example, drive shaft 291 may interface with cable supports 292 and 299 via bearings (e.g., ball bearings) such that drive shaft 291 may rotate without causing cable supports 292 and 299 to rotate. Cable supports 293 and 298 may be rotationally connected to cables 281 and 286, respectively.

Drive shaft 291 may be positioned within outer drive shaft 223 and may be powered by motor 264. Outer drive shaft 223 may support cable supports 294, 295, 296, and 297. Cable supports 295 and 296 may be rotationally connected to outer drive shaft 223. Cable supports 294 and 297 may be rotationally independent from outer drive shaft 223 (e.g., via a bearing such as a ball bearing). Cable supports 294, 295, 296, and 297 may be rotationally connected to cables 282, 283, 284, and 285, respectively. Outer drive shaft 223 may also support and be rotationally connected to cable support 247 which may be rotationally connected to cable 225. It is understood that cable 225 may be any type of cable, chain, tether, braid, belt or the like.

Cable 225 may be supported by cable support 247 and cable support 257. Cable support 247 may be rotationally connected to cable 225 and outer drive shaft 223. Cable support 257 may be rotationally connected to cable 225 and drive shave 249. Drive shaft 249 may be connected to motor 264. Motor 264 may cause rotation of drive shaft 249, which may be translated to outer drive shaft 223 via cable 225.

It is understood that cables 280 and 287, 281 and 286, 282 and 285, and 283 and 284 may be cable pairs that may be connected to a shelf and may move in sync. For example, cables 280 and 287 may move up and/or down at the same rate.

Figure 3A:
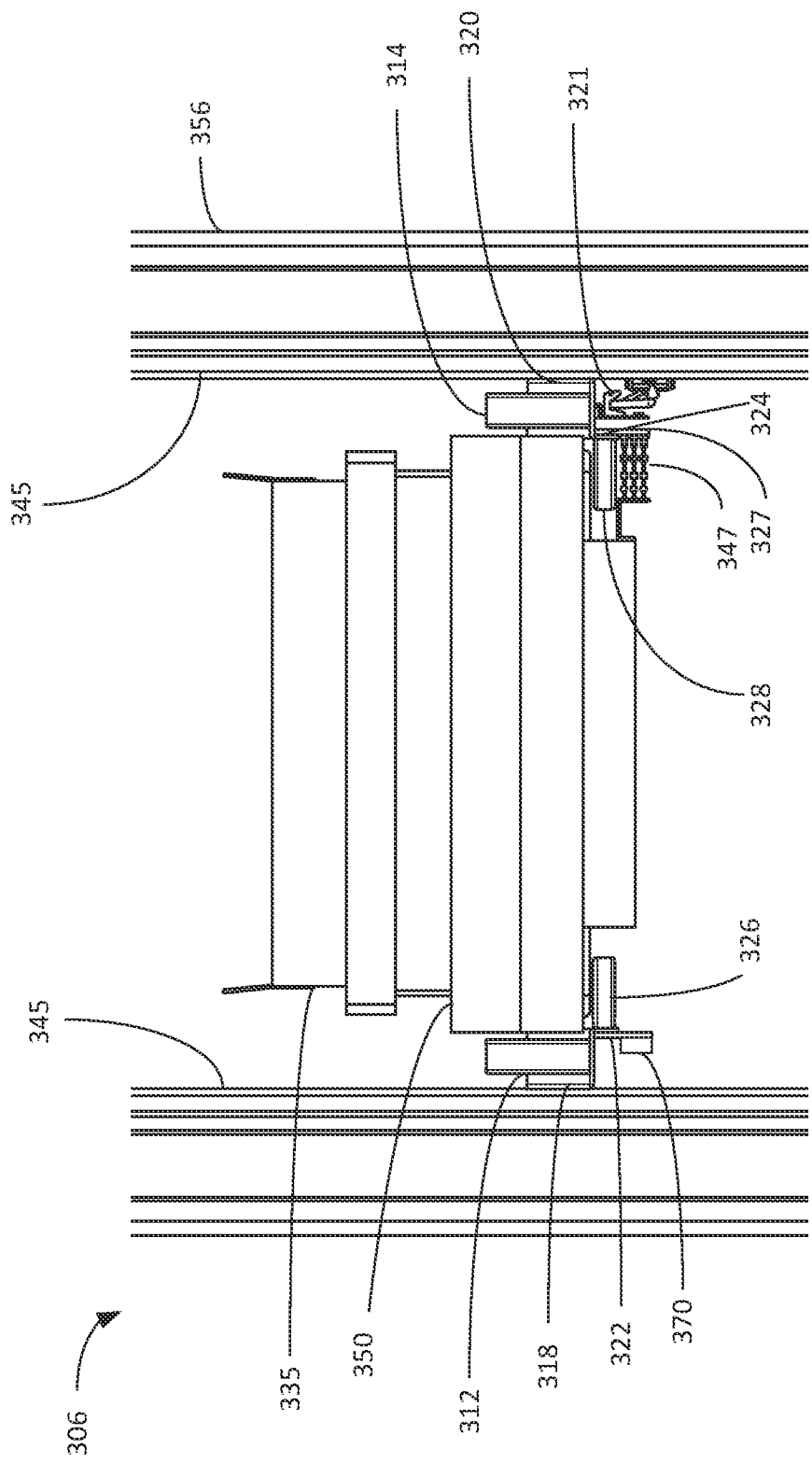
FIGS. 3A-3B are schematic illustrations of example use cases of a shuttle supported by the tower lift system, in accordance with one or more exemplary embodiments of the disclosure.
Figure 3B:
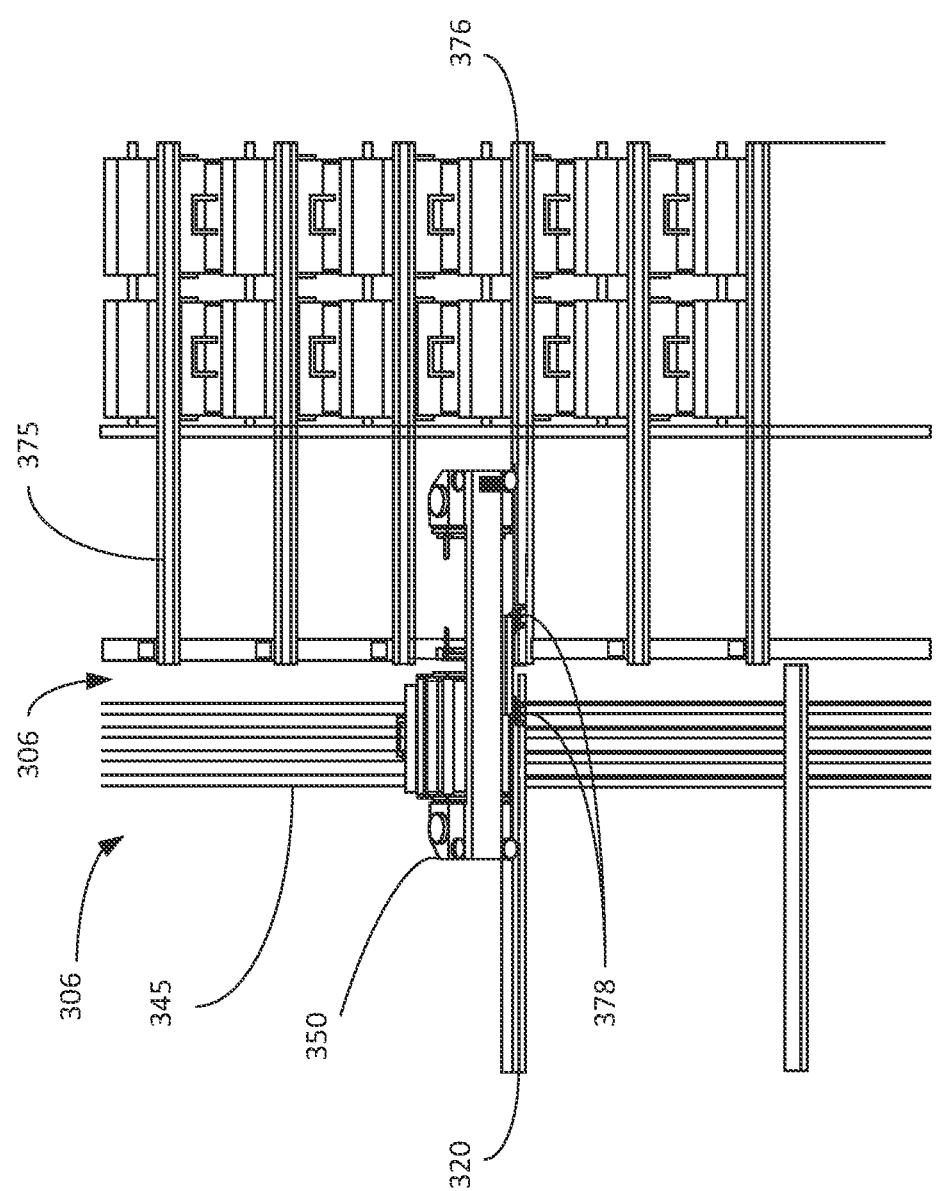

Referring now to FIGS. 3A-3B, an exemplary shuttle positioned on a lift system of a shuttle lift system is illustrated. Shuttle 350 may be the same as or similar to shuttle 150 of FIG. 1. Similarly, tower lift system 306 may be the same or similar to tower lift system 106 of FIG. 1. As shown in FIG. 3A, tower lift system 306 may include support frame 356 and cables 345, which may be the same or similar to support frame 156 and cables 116 of FIG. 1. Tower lift system may also include shelf 318 and shelf 320, which may be the same or similar to shelves 118 and 120 of FIG. 1. As shown in FIG. 1, shuttle 350 may receive package container 335.

Shelf 118 and shelf 120 may be designed to receive and/or interface with wheels 312 and 314 of shuttle 350 and/or similarly oriented wheels of shuttle 350. For example, shelves 218 and 220 may have an L-shaped cross-section. Shelves 218 and 220 may further include flange 322 and 324, which may be designed to interface with wheels 326 and 328 and/or any other similarly oriented wheels of shuttle 350. Wheels 326 and 328 may be rotated 90 degrees with respect to wheels 312 and 314.

Shuttle 350 may include two brush arms (e.g., brush arm 347), which may interface with rail 327. Rail 327 may be electrified via electrical connection 321 of cable 345. Electrical connection 321 may connect to an electrical wire, cable or connection of cable 345 and may make an electrical connection with rail 327. The brush arms may be flexible and/or may be designed to make contact with rail 327 such that an electrical connection is formed between shuttle 150 and rail 327. In this manner, rail 327 may provide electrical power to shuttle 327. As there may exist a gap of a certain distance between an electrified rail of tower lift system 306 and the multi-level storage structure, two brush arms may be provided on shuttle 350 that are distanced an amount larger than the gap such that the electrical connection between tower lift system 306 and shuttle 350 is not lost as shuttle traverses the gap.

Shuttle 350 may further include sensor 370 which may be one or more sensors. For example, sensor 370 may be an encoder and may sense and/or read information on the multi-level storage structure to determine the level and/or height of the shelf with respect to the multi-level storage structure. Each shelf and/or shuttle may be in wired and/or wireless communication with the controller and/or server and may share this information with the controller and/or server. Lift and/or an entry and/or exit of each of the multi-level storage structure may include a photocell or other sensor for detecting obstructions along the tower lift system and/or at each level. Additionally, or alternatively, each shelf may include a barcode reader and may read barcodes or other optical information from each level of the multi-level storage structure. This information may be sent to the controller and/or server for avoiding collisions.

Referring now to FIG. 3B, shuttle 350 is illustrated transferring between tower lift system 306 to multi-level storage structure 375. Multi-level storage structure 375 may be the same or similar to multi-level storage structures 130 and/or 140 of FIG. 1. As shown in FIG. 3B, shelf 320 may be raised or lowered to level 376 of multi-level storage structure 375. A controller may then cause shuttle 350 to transfer from tower lift system 306 to multi-level storage structure 375. For example, tower lift system 306 may power shuttle 350 via brush arms 378 to cause the wheels of shuttle 350 to turn to move shuttle 350 to multi-level storage structure 375. Multi-level storage structure 375 may provide power to shuttle 350 once one or more brush arms 378 of shuttle 350 contact multi-level storage structure 375. Distance 306 between tower lift system 306 and multi-level storage structure 375 may be smaller than a distance between brush arms 378 such that at least one brush arm is always in contact with tower lift system 306 and/or multi-level storage structure 375.

Figure 4:
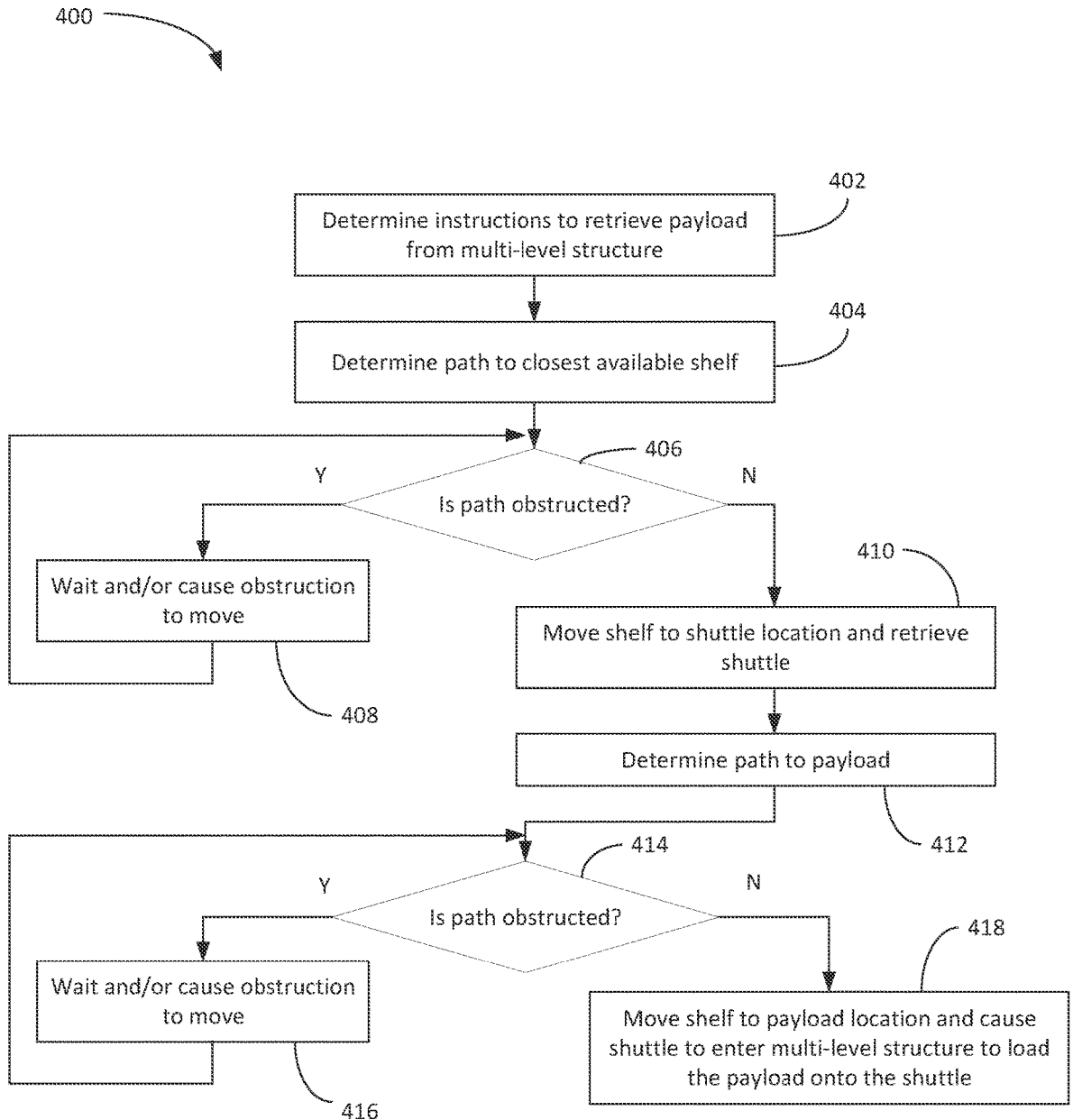
FIG. 4 is a schematic illustrations of example process flow for controlling a tower lift that is an ascender system in accordance with one or more example embodiments of the disclosure.

Referring now to FIG. 4, example process flow 400 of a shuttle lift system (e.g., shuttle lift system 100 of FIG. 1) is depicted for loading a shuttle (e.g., shuttle 150 of FIG. 1) onto a tower lift system (e.g., tower lift system 106), lifting the shuttle to a desired level, and unloading the shuttle onto a multi-level storage structure (e.g., multi-level storage structures 130 and 140 of FIG. 1). The tower lift system may be an ascender tower lift system designed to lift shuttles. To initiate the shuttle lift system for lifting a shuttle, at block 402 computer-executable instructions stored on a memory of a device, such as a computing device, may be executed to determine instructions to retrieve a payload from multi-level storage structure. For example, a server may send instructions to a controller to retrieve a certain payload.

At block 404, computer-executable instructions stored on a memory of a device, such as a computing device, may be executed to determine a location of the payload and may determine the closest available shuttle. Based on the location of the shuttles, the closest available shelf may be determined. A path between the closest available shuttle and the closest available pair of shelves may be determined.

At decision 406, computer-executable instructions stored on a memory of a device, such as a computing device, may be executed to determine if the path is obstructed (e.g. if there are shelves and/or shuttles in the path). If the path is obstructed, at block 408 computer-executable instructions stored on a memory of a device, such as a computing device, may be executed to wait a set period of time (e.g., 5 seconds) and/or cause the obstruction (e.g., shelf and/or shuttle) to move and then reinitiate decision 406.

If the path is not obstructed, at block 410, computer-executable instructions stored on a memory of a device, such as a computing device, may be executed to move a pair of shelves to the level of the multi-level storage structure at which the shuttle is located and retrieve the shuttle. For example, once the pair of shelves reach the desired level, the controller may cause the shuttle to move toward the tower lift system and into the pair of shelves.

At block 412, computer-executable instructions stored on a memory of a device, such as a computing device, may be executed to determine a path to the payload. This may include determining a level of the multi-level storage structure at which the payload is located. At decision 414, computer-executable instructions stored on a memory of a device, such as a computing device, may be executed to determine if the path is obstructed (e.g. there are shelves and/or shuttles in the path).

If the path is obstructed, at block 416 computer-executable instructions stored on a memory of a device, such as a computing device, may be executed to wait a set period of time (e.g., 5 seconds) and/or cause the obstruction (e.g., shelf and/or shuttle) to move and then reinitiate decision 414. If the path is not obstructed, at block 418, computer-executable instructions stored on a memory of a device, such as a computing device, may be executed to move the pair of shelves and the shuttle to the level of the multi-level storage structure at which the payload is located and cause the shuttle to exit the tower lift system and enter the multi-level storage structure. The shuttle may be caused to move along the level of the multi-level storage structure to the payload and to load the payload (e.g., package container and/or package) onto the shuttle.

Figure 5:
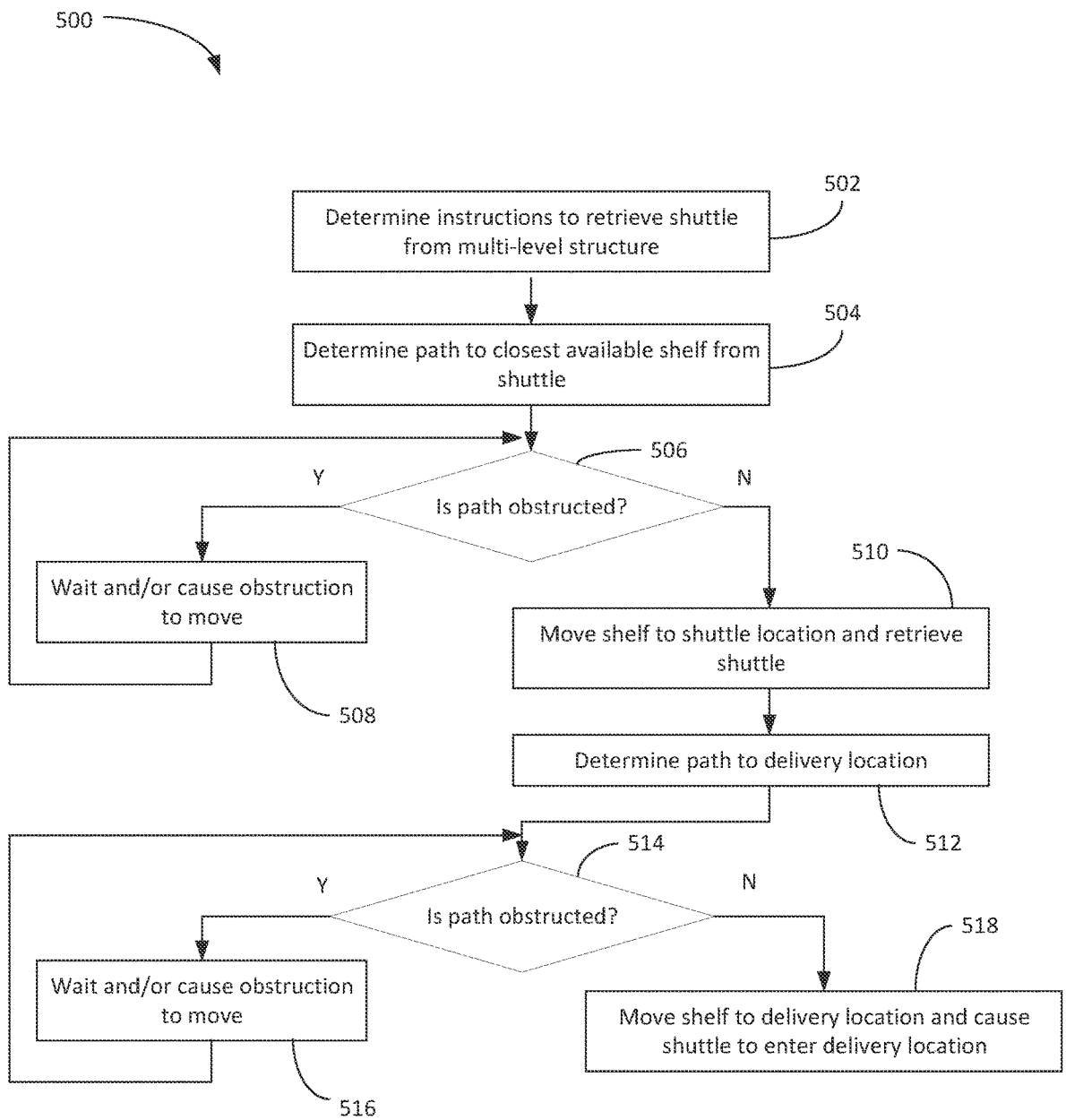
FIG. 5 is a schematic illustrations of example process flow for controlling a tower lift that is a descender system in accordance with one or more example embodiments of the disclosure.

Referring now to FIG. 5, example process flow 500 of a shuttle lift system (e.g., shuttle lift system 100 of FIG. 1) is depicted for moving a shuttle (e.g., shuttle 150 of FIG. 1) onto a tower lift system (e.g., tower lift system 106), lowering the shuttle to a desired level, and delivering the shuttle to a delivery area. For example, the tower lift system of FIG. 5 may be a descender tower lift system designed to lower shuttles. To initiate the shuttle lift system for lowering a shuttle, at block 502 computer-executable instructions stored on a memory of a device, such as a computing device, may be executed to determine instructions to retrieve a shuttle with a payload from multi-level storage structure. It is understood that the tower lift system may be the same or different from that of FIG. 4.

At block 504, computer-executable instructions stored on a memory of a device, such as a computing device, may be executed to determine a location of the shuttle with the payload. Based on the location of the shuttle with the payload, the closest available shelf may be determined. A path between the shuttle with the payload and the closest available pair of shelves may be determined.

At decision 508, computer-executable instructions stored on a memory of a device, such as a computing device, may be executed to determine if the path is obstructed (e.g. there are shelves and/or shuttles in the path). If the path is obstructed, at block 508 computer-executable instructions stored on a memory of a device, such as a computing device, may be executed to wait a set period of time (e.g., 5 seconds) and/or cause the obstruction (e.g., shelf and/or shuttle) to move and then reinitiate decision 506.

If the path is not obstructed, at block 410, computer-executable instructions stored on a memory of a device, such as a computing device, may be executed to move a pair of shelves to the level of the multi-level storage structure at which the shuttle is located and retrieve the shuttle. For example, once the pair of shelves reach the desired level, the controller may cause the shuttle to move toward the tower lift system and into the pair of shelves.

At block 412, computer-executable instructions stored on a memory of a device, such as a computing device, may be executed to determine a path to the delivery location. The delivery location may be a level of the multi-level storage structure. At decision 414, computer-executable instructions stored on a memory of a device, such as a computing device, may be executed to determine if the path is obstructed (e.g. if there are shelves and/or shuttles in the path).

If the path is obstructed, at block 516 computer-executable instructions stored on a memory of a device, such as a computing device, may be executed to wait a set period of time (e.g., 5 seconds) and/or cause the obstruction (e.g., shelf and/or shuttle) to move and then reinitiate decision 514. If the path is not obstructed, at block 518, computer-executable instructions stored on a memory of a device, such as a computing device, may be executed to move the pair of shelves and the shuttle to the delivery location and cause shuttle to exit the tower lift system.

Illustrative Device Architecture

Figure 6:
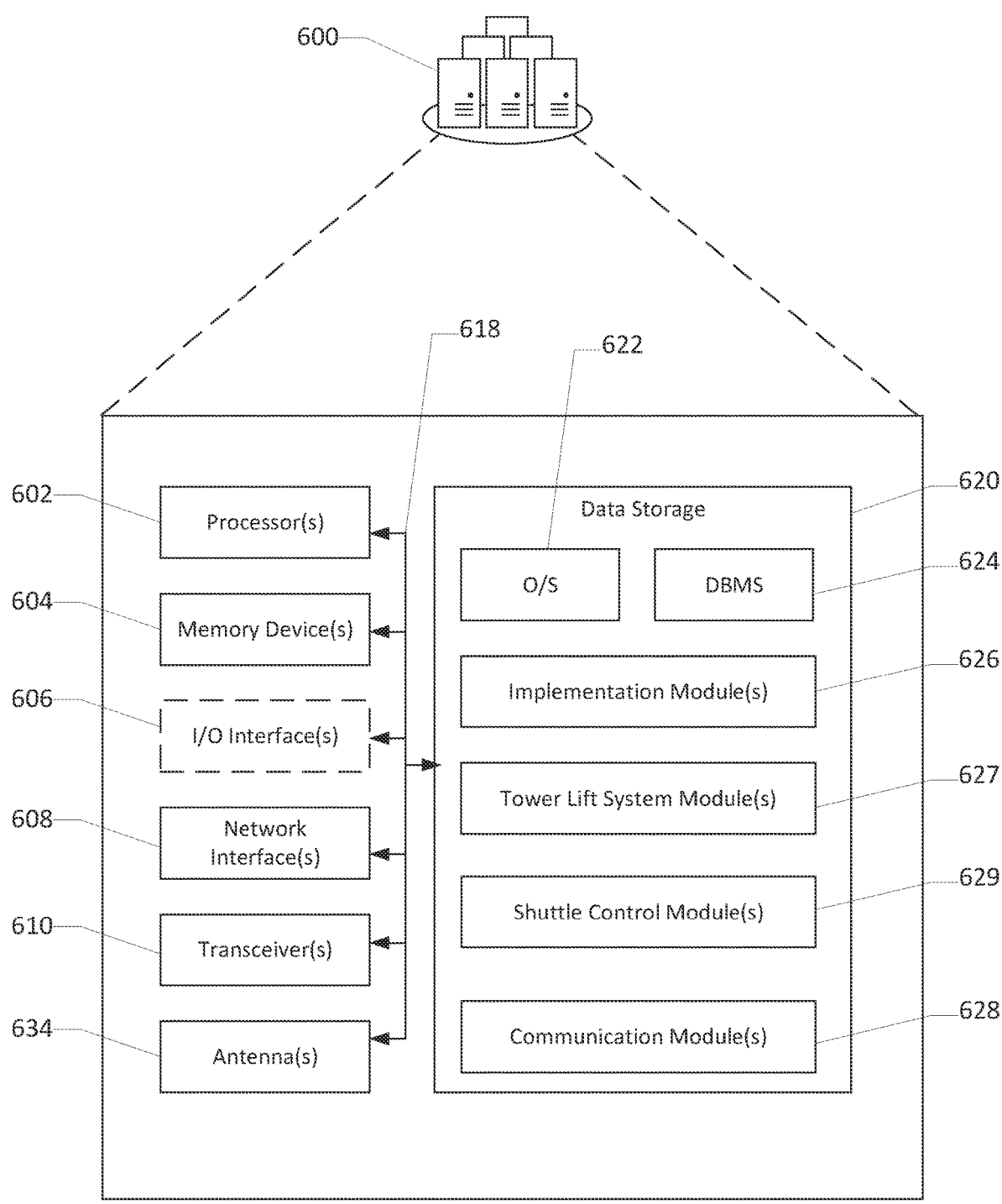
FIG. 6 is a schematic block diagram of a controller in accordance with one or more exemplary embodiments of the disclosure.

FIG. 6 is a schematic block diagram of an illustrative controller 600 of the shuttle lift system in accordance with one or more example embodiments of the disclosure. The controller 600 may include any suitable computing device capable of receiving and/or sending data, and may optionally be coupled to devices including, servers, controllers, user devices, delivery vehicles, fulfillment center devices, conveyor devices, and any other devices such as a smartphone, tablet, e-reader, mobile device, wearable device, a connected device, a desktop computer, a laptop computer, one or more servers, or the like. The controller 600 may correspond to controller 104 of FIG. 1 and/or any other controller of FIGS. 1-5.

The controller 600 may be configured to communicate (e.g., one or more networks) with a server (e.g., server 102 of FIG. 1). Controller 600 may additionally communicate via one or more networks with one or more servers, controllers, user devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the controller 600 may include one or more processors (processor(s)) 602, one or more memory devices 604 (generically referred to herein as memory 604), one or more input/output (I/O) interface(s) 606, one or more network interface(s) 608, one or more transceivers 612, one or more antenna(s) 634, and data storage 620. The controller 600 may further include one or more buses 618 that functionally couple various components of the controller 600. The controller 600 may further include one or more antenna(e) 634 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the controller 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the controller 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more optional database management systems (DBMS) 624; and one or more program module(s), applications, engines, computer-executable code, scripts, or the like such as, for example, one or more implementation module(s) 626, one or more tower lift system module(s) 627, one or more communication module(s) 628, and/or one or more shuttle control module(s) 629. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the controller 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the controller 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 626 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, determining user devices associated with a user account, sending signals to user devices, electronic devices, other computing devices, servers, datastores and the like, initiating commands locally or at remote devices, and the like.

The tower lift system module(s) 627 may include computer-executable instructions, code, or the like that responsive to execution by one or more of the processor(s) 602 may perform functions including, but not limited to, overseeing control and operation of the tower lift system including movement of shelves, cables, drive shafts and motors.

The communication module(s) 628 may include computer-executable instructions, code, or the like that responsive to execution by one or more of the processor(s) 602 may perform functions including, but not limited to, communicating with one or more devices, for example, via wired or wireless communication, communicating with controllers, multi-level storage structures, sensors, servers, user devices, conveyor devices, fulfillment center devices and delivery vehicles, communicating with servers (e.g., remote servers), communicating with remote datastores and/or databases, sending or receiving notifications or commands/directives, communicating with cache memory data, and the like.

The shuttle control module(s) 627 may include computer-executable instructions, code, or the like that responsive to execution by one or more of the processor(s) 602 may perform functions including, but not limited to control and/or movement of the shuttle onto and off of the tower lift system and/or control of the shuttle on the multi-level storage structure, which may include loading one or more package containers and/or packages onto the shuttle.

Referring now to other illustrative components depicted as being stored in the data storage 620, the O/S 622 may be loaded from the data storage 620 into the memory 604 and may provide an interface between other application software executing on the controller 600 and hardware resources of the controller 600. More specifically, the O/S 622 may include a set of computer-executable instructions for managing hardware resources of the controller 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the controller 600 is a mobile computing device, the DBMS 624 may be any suitable light-weight DBMS optimized for performance on a mobile device.

Referring now to other illustrative components of the controller 600, the optional input/output (I/O) interface(s) 606 may facilitate the receipt of input information by the controller 600 from one or more I/O devices as well as the output of information from the controller 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; and so forth. Any of these components may be integrated into the controller 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The controller 600 may further include one or more network interface(s) 608 via which the controller 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHZ channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHZ).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the controller 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the controller 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the controller 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program jmodule(s) depicted in FIG. 6 may be implemented, at least partially, in hardware and/or firmware across any number of devices.

It should further be appreciated that the controller 600 may include alternate and/or additional hardware, software, or firmware components beyond those described or depicted without departing from the scope of the disclosure. More particularly, it should be appreciated that software, firmware, or hardware components depicted as forming part of the controller 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might." or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a support structure having an upper portion and a lower portion;
a first drive shaft positioned on a lower portion of the support structure;
a second drive shaft positioned on the lower portion of the support structure and offset from the first drive shaft;
a first tether loop and a second tether loop each rotationally connected to the first drive shaft and configured to extend between the first drive shaft and the upper portion of the support structure;
a first outer drive shaft positioned on the lower portion of the support structure and configured to house a portion first drive shaft, the first outer drive shaft and the first drive shaft configured to rotate independently;
a transfer tether loop configured to transfer rotational motion from the second drive shaft to the first outer drive shaft;
a third tether loop and a fourth tether loop each rotationally connected to the first outer drive shaft and configured to extend between the first outer drive shaft and the upper portion of the support structure;
a first shelf coupled to the first tether loop and the second tether loop and configured to receive a first shuttle;
a second shelf coupled to the third tether loop and the fourth tether loop and configured to receive a second shuttle;
a first motor configured to rotate the first drive shaft to cause the first tether loop and the second tether loop to rotate to move the first shelf along the tower structure; and
a second motor configured to rotate the second drive shaft to cause the third tether loop and the fourth tether loop to rotate to move the second shelf along the tower structure independent of the first shelf.

2. The system of claim 1, further comprising:
the first shuttle having at least four wheels, a payload receiving area, and a first power transmission receiver configured to interface with a first power transmission system of the first shelf; and
the second shuttle having at least four wheels, a second payload receiving area, and a second power transmission receiver configured to interface with a second power transmission system of the second shelf.

3. The system of claim 2, wherein:
the first shelf is configured to receive the first shuttle from a multi-level storage structure;
the second shelf is configured to receive the second shuttle from the multi-level storage structure; and
the first shelf and the second shelf are configured to move simultaneously.

4. The system of claim 1, wherein the first shelf and the second shelf are configured to move along an interior of the support structure and along an exterior of the support structure.

5. A system comprising:
a support structure having an upper portion and a lower portion;
a first drive shaft positioned on a lower portion of the support structure;
a second drive shaft positioned on the upper portion of the support structure;
a first tether loop rotationally connected to the first drive shaft and configured to extend between the first drive shaft and the second drive shaft;
a second tether loop rotationally connected to the second drive shaft and configured to extend between the second drive shaft and the first drive shaft;
a first shelf coupled to the first tether loop, configured to receive a first shuttle; and
a second shelf coupled to the second tether loop and configured to receive a second shuttle;
wherein the first drive shaft is configured to move the first tether loop to move the first shelf along an inside and an outside of the support structure; and
wherein the second drive shaft is configured to move the second tether loop to move the second shelf along the support structure independent of the first shelf.

6. The system of claim 5, further comprising:
a third drive shaft positioned on the lower portion of the support structure and offset from the first drive shaft;
a first outer drive shaft positioned on the lower portion of the support structure and configured to house a portion of the first drive shaft, the first outer drive shaft and the first drive shaft configured to rotate independently; and
a first transfer tether loop configured to transfer rotational motion from the third drive shaft to the first outer drive shaft.

7. The system of claim 6, further comprising:
a fourth drive shaft positioned on the upper portion of the support structure and offset from the second drive shaft;
a second outer drive shaft positioned on the upper portion of the support structure and configured to house a portion of the second drive shaft, the second outer drive shaft and the second drive shaft configured to rotate independently;
a second transfer tether loop configured to transfer rotational motion from the fourth drive shaft to the second outer drive shaft;
a third tether loop rotationally connected to the first outer drive shaft and configured to extend between the first outer drive shaft and the second outer drive shaft;
a third shelf coupled to the third tether loop and configured to receive a third shuttle; and a fourth tether loop rotationally connected to the second outer drive shaft and configured to extend between the second outer drive shaft and the first outer drive shaft; and a fourth shelf coupled to the fourth tether loop and configured to receive a fourth shuttle.

8. The system of claim 5, further comprising:
a first motor configured to rotate the first drive shaft to cause the first tether loop to move the first shelf along the support structure; and
a second motor configured to rotate the second drive shaft to cause the third tether loop to rotate to move the second shelf along the support structure independent of the first shelf.

9. The system of claim 5, wherein the first shelf has a first power transmission system configured to power the first shuttle and the second shelf has a second power transmission system configured to power the second shuttle, the system further comprising:
the first shuttle having at least four wheels, a payload receiving area, and a power transmission receiver configured to interface with the first power transmission system of the first shelf; and
the second shuttle comprising four wheels, a second payload receiving area, and a second power transmission receiver configured to interface with the second power transmission system of the second shelf.

10. The system of claim 9, wherein:
the first shuttle has first and second brush arms distanced a first amount and configured to interface with the first shelf and the second shuttle has third and fourth brush arms distanced the first amount and configured to interface with the second shelf, and
the support structure is configured to be distanced from a multi-level storage structure a second amount which is smaller than the first amount.

11. The system of claim 9, further comprising a multi-level storage structure having at least a first level and a second level each configured to support payloads, the first level and the second level each having a rail configured to align with the first shelf and the second shelf and configured to receive the first shuttle and the second shuttle.

12. The system of claim 5, wherein the first tether loop supplies electrical power to the first shelf and the second tether loop supplies electrical power to the second shelf.

13. The system of claim 5, wherein the first tether loop is supported by the second drive shaft via a first bearing, the second tether loop is supported by the first drive shaft via a second bearing, the first tether loop is rotationally independent from the second drive shaft, and the second tether loop is rotationally independent from the first draft shaft.

14. The system of claim 5, further comprising:
a third tether loop coupled to the first shelf, rotationally connected to the first drive shaft, and configured to extend between the first drive shaft and the second drive shaft; and
a fourth tether loop coupled to the second shelf, rotationally connected to the second drive shaft, and configured to extend between the first drive shaft and the second drive shaft.

15. A method comprising:
determining, by a controller, instructions to retrieve a first shuttle from a multi-level storage structure, the shuttle positioned on an initial level of the multi-level storage structure;
determining a first shelf of a tower lift system adjacent to the multi-level storage structure is in closest proximity to the initial level;
determining a path along the tower lift system between the first shelf and the initial level is obstructed by a second shelf;
causing a first drive shaft to rotate to move the second shelf, the first drive shaft positioned on an upper portion of the tower lift system and rotationally connected to a first tether loop that extends between the first drive shaft and a second drive shaft positioned on a lower portion of the tower lift system, the first tether loop connected to the second shelf;
causing the second drive shaft to rotate to move the first shelf to align with the initial level of the multi-level storage structure, the second drive shaft rotationally connected to a second tether loop connected to the first shelf and extending between the first drive shaft and the second drive shaft, the first drive shaft and the second drive shaft adapted to rotate independently; and
causing the shuttle to move from the initial level to the first shelf.

16. The method of claim 15, further comprising:
causing a first motor to rotate the first drive shaft to cause the first tether loop to move the second shelf; and
causing a second motor to rotate the second drive shaft to cause the second tether loop to move the first shelf.

17. The method of claim 15, further comprising:
causing a first drive shaft to rotate to move the second shelf from a first position above the first shelf and within the tower lift system to a second position outside of the tower lift system, to a third position below the first shelf and within the tower lift system.

18. The method of claim 15, further comprising:
receiving a signal from a first sensor positioned on a secondary level of the multi-level storage structure, the signal indicative of an obstacle detected at an entrance of the secondary level.

19. The method of claim 15, further comprising:
causing a third drive shaft to rotate to move a third shelf, the first drive shaft partially disposed within the third drive shaft and configured to rotate independent of the third drive shaft, the third draft shaft rotationally connected to a third tether loop coupled to a third shelf and extending between the third drive shaft and a fourth drive shaft, the second drive shaft partially disposed within the fourth drive shaft, the fourth drive shaft rotationally independent from the second drive shaft.

20. The method of claim 19, further comprising:
causing the fourth drive shaft to rotate to move a fourth shelf, the fourth drive shaft rotationally connected to a fourth tether loop coupled to a fourth shelf and extending between the fourth drive shaft and the third drive shaft.

* * * * *